A. L. PUTNAM.
VEHICLE WHEEL.
APPLICATION FILED APR. 15, 1920.
1,398,739.
Patented Nov. 29, 1921.
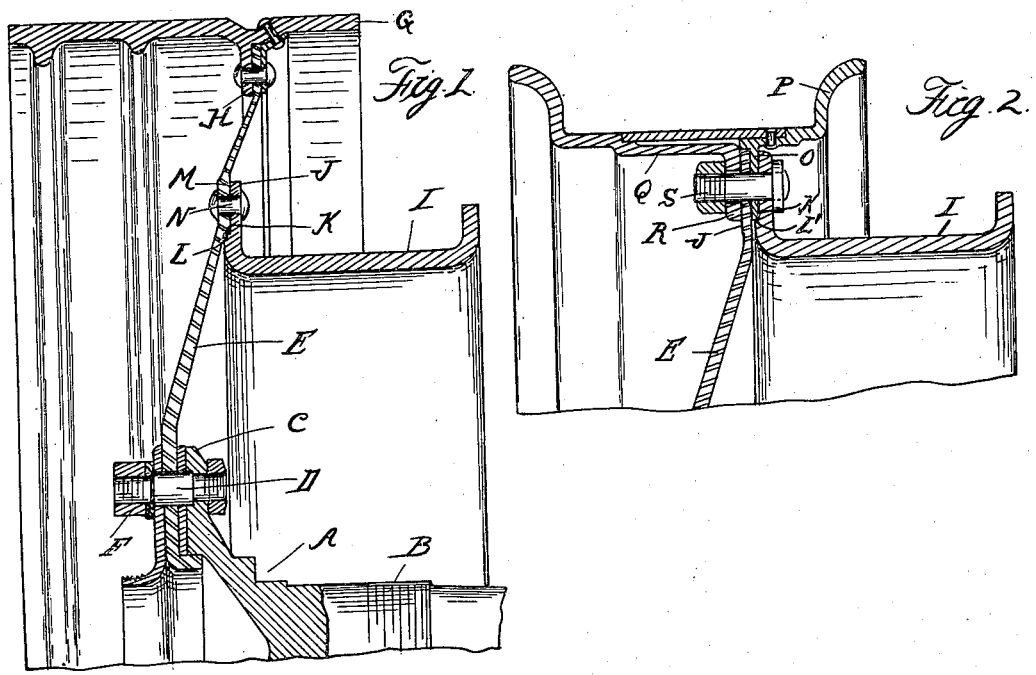
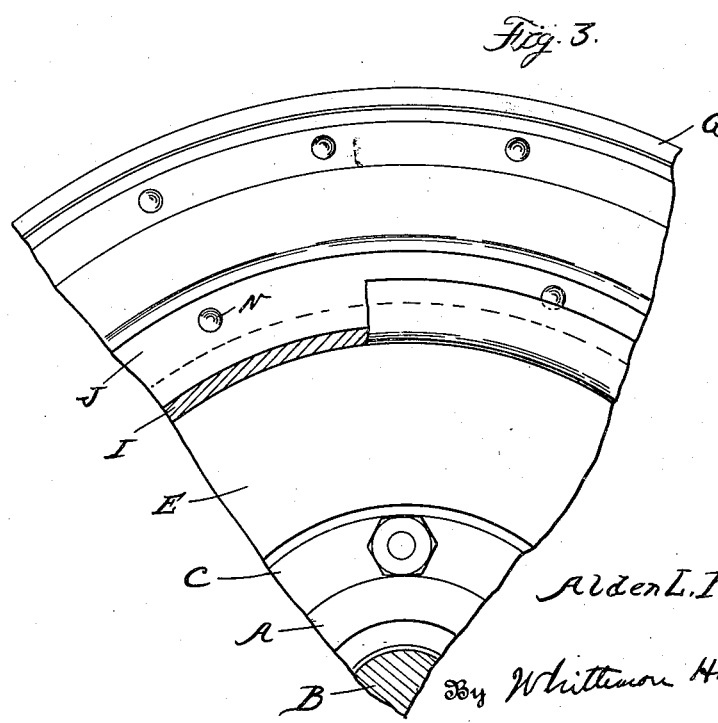
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

VEHICLE-WHEEL.

1,398,739.  Specification of Letters Patent.  Patented Nov. 29, 1921.

Application filed April 15, 1920. Serial No. 374,172.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels of the dished disk type and has more particular reference to the construction of brake drum and means for mounting the same upon the disk, as hereinafter set forth.

In the drawings:

Figure 1 is a section through a wheel, showing the brake drum applied thereto;

Fig. 2 is a similar view of a modified construction;

Fig. 3 is a sectional elevation of the construction shown in Fig. 1.

A is the hub, which as specifically shown is formed directly upon the axle B and is provided with a radially outwardly-extending flange C having laterally extending studs D secured thereto. E is the dished disk which is clamped to the hub by the studs D and clamping nuts F. The peripheral portion of the disk is connected to a rim G by any suitable means, such as the inwardly extending flange H on said rim riveted to the disk.

Wheels designed for use on trucks or any other place where the load is relatively high, must be provided with heavy brake drums, together with means of attachment which will hold said drums concentric with the axis of the wheel. To accomplish this result, the brake drum I is formed with a radially outwardly-extending securing flange J arranged parallel to the plane of rotation and this flange is partly cut away so as to form an annular shoulder K. The disk E is provided with a corresponding shoulder L, which is preferably formed upon a portion M in the body of the disk of greater thickness than the portions on opposite sides thereof. The portion M is also arranged parallel to the plane of rotation, whereas the adjacent portions of the disk are at an angle thereto. The arrangement is such that the drum I may be readily secured to the disk in concentric relation with the axis of the wheel by engaging the shoulders K and L with each other and by securing the flange J to the portion M by rivets N, or other suitable means.

In the modified construction shown in Fig. 2, the diameter of the brake drum is larger relative to the diameter of the wheel, so that the flange J extends outward to substantially the internal diameter of the rim. With this construction the shoulder K is engaged with a corresponding shoulder L' formed on a radially inwardly projecting flange O, which is integral with the removable tire-engaging flange P. The complementary portion Q of the rim is provided with a parallel flange R and bolts S passing through registering apertures in the flanges J, L and R and the disk E serve to clamp all of these members together.

What I claim as my invention is:

1. The combination with a wheel of the disk type, of a brake drum for said wheel having an outwardly projecting radial flange with an annular shoulder thereon, said flange being parallel to a portion of the disk, and a corresponding shoulder on said disk for engaging the shoulder on said flange and centering the drum with the axis of the wheel.

2. In a vehicle wheel of the disk type, the combination with a brake drum, of a radially extending flange upon said drum provided intermediate its inner and outer peripheries with an annular shoulder, a complementary shoulder on a portion of the disk parallel to said flange, and means for clamping said flange to said disk.

3. The combination with a wheel, of the disk type, of a brake drum for said wheel having a radially projecting flange, with an annular shoulder thereon, said flange being parallel to a portion of the disk, said disk being formed with a corresponding shoulder for engaging the shoulder of said flange, the disk being dished at substantially the same inclination between the portion engaged by the brake drum and the rim and hub respectively.

In testimony whereof I affix my signature.

ALDEN L. PUTNAM.